US009103958B2

(12) United States Patent
Kuan et al.

(10) Patent No.: US 9,103,958 B2
(45) Date of Patent: Aug. 11, 2015

(54) BACK LIGHT MODULE AND DISPLAY DEVICE USING THE SAME

(71) Applicant: AU OPTRONICS CORP., Hsin-Chu (TW)

(72) Inventors: Yu-Chieh Kuan, Hsin-Chu (TW); Yu-Sen Jang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 89 days.

(21) Appl. No.: 13/950,450

(22) Filed: Jul. 25, 2013

(65) Prior Publication Data

US 2014/0140092 A1 May 22, 2014

(30) Foreign Application Priority Data

Nov. 16, 2012 (TW) .............................. 101142975 A (51) Int. Cl.
*F21V 8/00* (2006.01)
(52) U.S. Cl.
CPC .............. *G02B 6/0088* (2013.01); *G02B 6/005* (2013.01)
(58) Field of Classification Search
CPC .... G02B 6/0011; G02B 6/005; G02B 6/0088; G02B 6/0086; G02F 1/1336; G02F 1/133608; G02F 1/133615
See application file for complete search history.

(56) References Cited

U.S. PATENT DOCUMENTS

| | | | | |
|---|---|---|---|---|
| 2001/0028560 | A1* | 10/2001 | Yachi et al. ...................... | 362/31 |
| 2004/0257791 | A1 | 12/2004 | Chen et al. | |
| 2005/0094051 | A1* | 5/2005 | Lin et al. ......................... | 349/58 |
| 2006/0268190 | A1 | 11/2006 | Yu et al. | |
| 2006/0291255 | A1* | 12/2006 | Tsai et al. ...................... | 362/633 |
| 2007/0165424 | A1* | 7/2007 | Sakai ............................. | 362/633 |
| 2008/0106669 | A1 | 5/2008 | Tsai et al. | |
| 2013/0044462 | A1* | 2/2013 | Cheng .......................... | 362/97.1 |

FOREIGN PATENT DOCUMENTS

| | | |
|---|---|---|
| CN | 1567060 A | 1/2005 |
| CN | 2800317 Y | 7/2006 |
| CN | 101174057 A | 5/2008 |
| CN | 101424812 A | 5/2009 |
| CN | 101587261 | 11/2009 |

(Continued)

OTHER PUBLICATIONS

Taiwan Patent Office, "Office Action", Nov. 24, 2014.

(Continued)

*Primary Examiner* — Bao Q Truong
(74) *Attorney, Agent, or Firm* — WPAT, PC; Justin King (57) ABSTRACT

A back light module includes a bezel, a light-guiding plate, an optical film and a fixing element. The bezel includes frame strips defining an accommodating space. Each frame strip has a bottom surface, a carrier surface opposite to the carrier surface, and a lateral surface connected between the bottom and carrier surfaces and facing to the accommodating space. The lateral surface of the frame strips has a first cave extended from the carrier surface through the bottom surface. The light-guiding plate and the optical film are configured in the accommodating space. The optical film has at least a first protrusion within the first cave. The fixing element is configured on the carrier surfaces of the frame strips and a portion of the optical film and corresponds to the boundary between the first protrusion and the first cave. A display device using the back light module is provided.

12 Claims, 7 Drawing Sheets

(56) References Cited

FOREIGN PATENT DOCUMENTS

| | | |
|---|---|---|
| TW | I256499 | 6/2006 |
| TW | M306335 | 2/2007 |
| TW | I286246 | 9/2007 |
| TW | I357521 | 4/2009 |
| TW | 201124772 A1 | 7/2011 |
| TW | M416781 | 11/2011 |

OTHER PUBLICATIONS

China Patent Office, "Office Action", Jun. 3, 2014.
China Patent Office, "Office Action", Jan. 20, 2015.

* cited by examiner

BACK LIGHT MODULE AND DISPLAY DEVICE USING THE SAME

BACKGROUND

1. Technical Field

The present invention relates to a back light module, and more particularly to a back light module with uniform light-emitting and a display device using the same.

2. Description of the Related Art

Figure 1A:
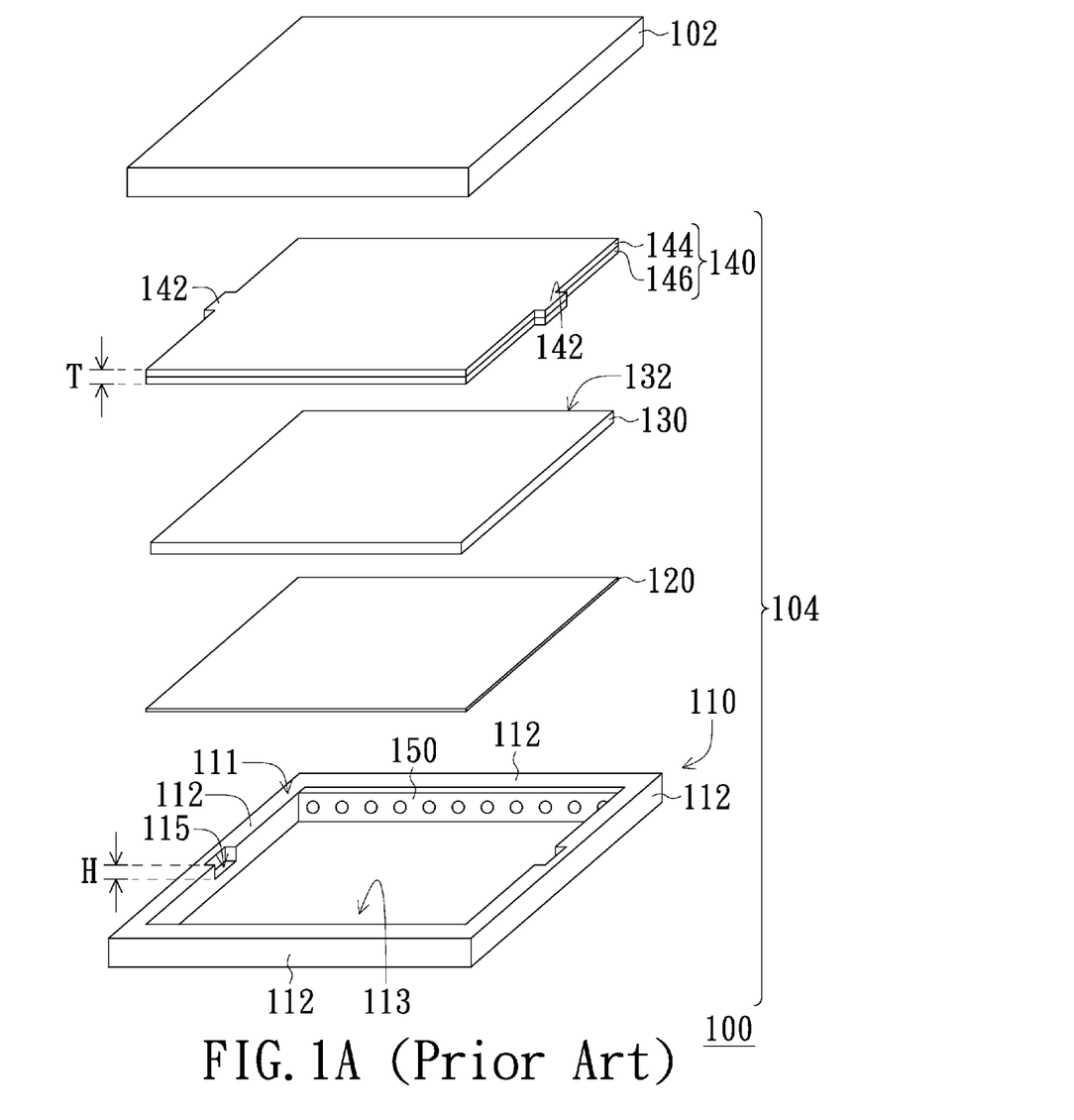
FIG. 1A is a schematic disassembling view of a conventional liquid crystal display device.
Figure 1B:
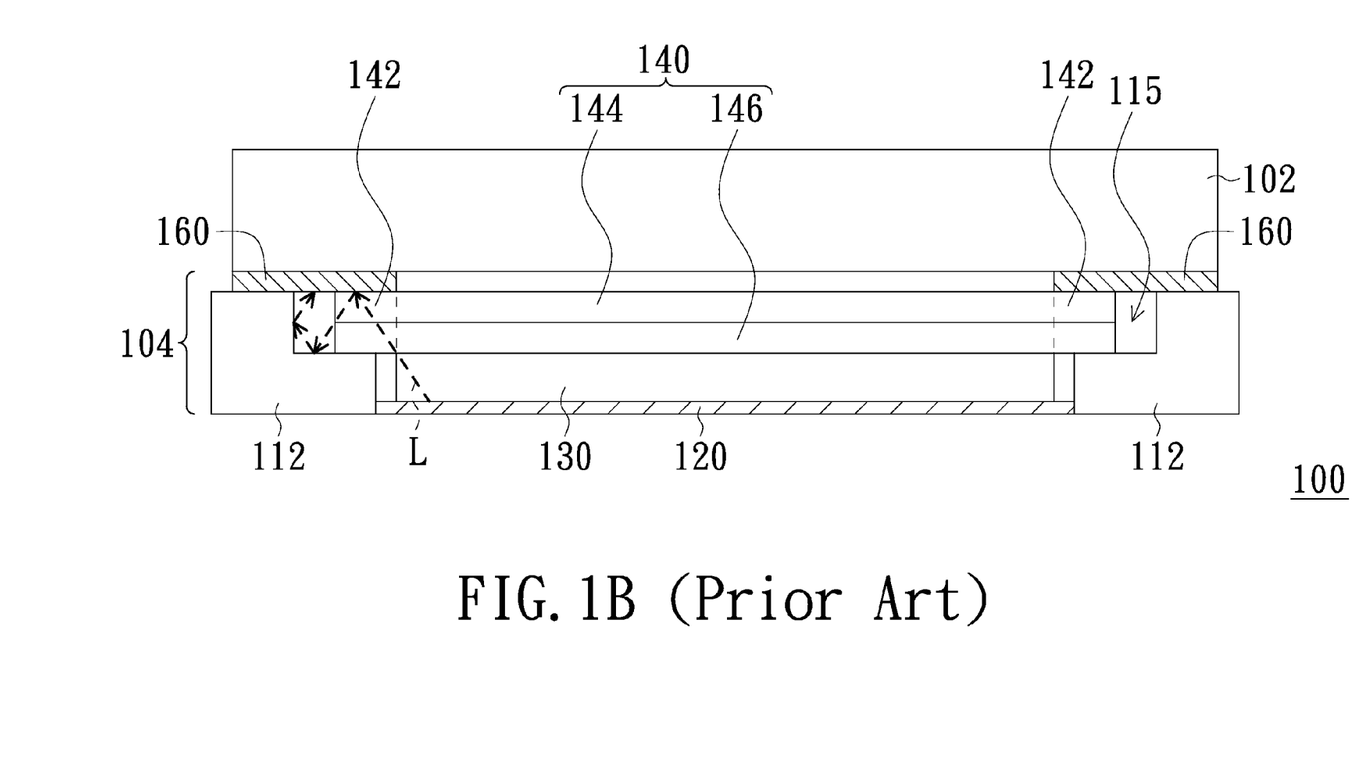
FIG. 1B is a cross-sectional, schematic view of the liquid crystal display device of FIG. 1A.

The liquid crystal display device is widely used in cellar phone, notebook, personal computer, personal digital assistant and other consumer electronic products. FIG. 1A is a schematic disassembling view of a conventional liquid crystal display device. FIG. 1B is a cross-sectional, schematic view of the liquid crystal display device of FIG. 1A. Referring to FIGS. 1A and 1B, the liquid crystal display device 100 includes a liquid crystal display panel 102 and a back light module 104, and the back light module 104 is located at one side of the liquid crystal display panel 102 for providing the enough brightness to the liquid crystal display panel 102 for displaying.

The back light module 102 includes a bezel 110, a reflector 120, a light-guide plate 130, an optical film 140 and a light source unit 150. The bezel 110 is composed of a plurality of frame strips 112, and the frame strips 112 surrounds an accommodating space 113. Each frame strip 112 has a carrier surface 111 and the display panel 102 is configured on the bezel 110 and contacts to the carrier surface 111. Moreover, the carrier surface 111 has at least one cave 115. The reflector 120 and the light-guide plate 130 are sequentially configured in the accommodating space 113. The optical film 140 is configured on the light-guide plate 130. Further, the optical film 140 has at least one protrusion 142 corresponding to the cave 115 of the frame strip 112 of the bezel 110, and the depth H of the cave 115 is consistent with the thickness T of the protrusion 142 of the optical film 140, so that the protrusion 142 can be located within the cave 115 for temporarily positioning the optical film 140. The light source unit 150 is configured at the light-incident side 132 of the light-guide plate 130 to providing a light to the liquid crystal display panel 102 for displaying images.

However, since the general optical film 140 includes prism film 144 and diffusion film 146 with condensing function, when the light emitted from the light source unit 150 is reflected by the frame strip 112 to the diffusion film 146, several bright lines will resulted therein around the diffusion film 146. Therefore, the uniformity of light-emitting of the back light module 104 would be decreased.

In order to solve the above-mentioned issue, a light-shielding band 160 is configured around the diffusion film 146 to prevent from forming the bright lines around the diffusion film 146 and increase the uniformity of light-emitting of the back light module 104.

However, as shown in FIG. 1B, after the light L emitted from the light source unit 150 emits into the cave 115 of the frame strip 112, the light L will be repeatedly reflected between the frame strip 112 and the light-shielding band 160 and through the prism film 144 several times in the cave 115, therefore the light will be condensed in the cave 115 so as to decrease the uniformity of light-emitting at the protrusion 142.

BRIEF SUMMARY

Therefore, the object of the present invention is to provide a back light module to improve the uniformity of the light-emitting.

Another object of the present invention is to provide a display device using the above-mentioned back light module to improve the display quality.

The present invention provides a back light module including a bezel, a light-guide plate, at least one optical film and a fixing element. The bezel includes a plurality of frame strips and the frame strips surround an accommodating space. Each frame strip respectively has a bottom surface, a carrier surface and a lateral surface wherein the bottom surface is opposite to the carrier surface and the lateral surface is connected between the bottom surface and the carrier surface and faces to the accommodating space. The lateral surface of at least one of the frame strips has at least one first cave extended from the carrier surface to the bottom surface. The light-guide plate and the optical film are configured in the accommodating space and the optical film is located above the light-guide plate. A side of the optical film has at least one first protrusion located within the first cave. The fixing element is configured on the carrier surfaces and a portion of the optical film and corresponds to a boundary between the at least one first protrusion and the at least one first cave.

The present invention provides a display device, includes the above-mentioned back light module and a display panel configured above the back light module.

In the back light module of the present invention, since the protrusion of the optical film is located within the cave extended from the carrier surface to the bottom surface, the light emitted from the light source unit can avoid being reflected by the frame strip to form a dark band by emitting out through the fixing element. Therefore, the display quality of the display device using the back light module can be improved.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Furthermore, in the following embodiments, the display devices are presented as examples for illustrating the applications of the back light module of the presented invention, but the presented invention is not limited hereto.

Figure 2A:
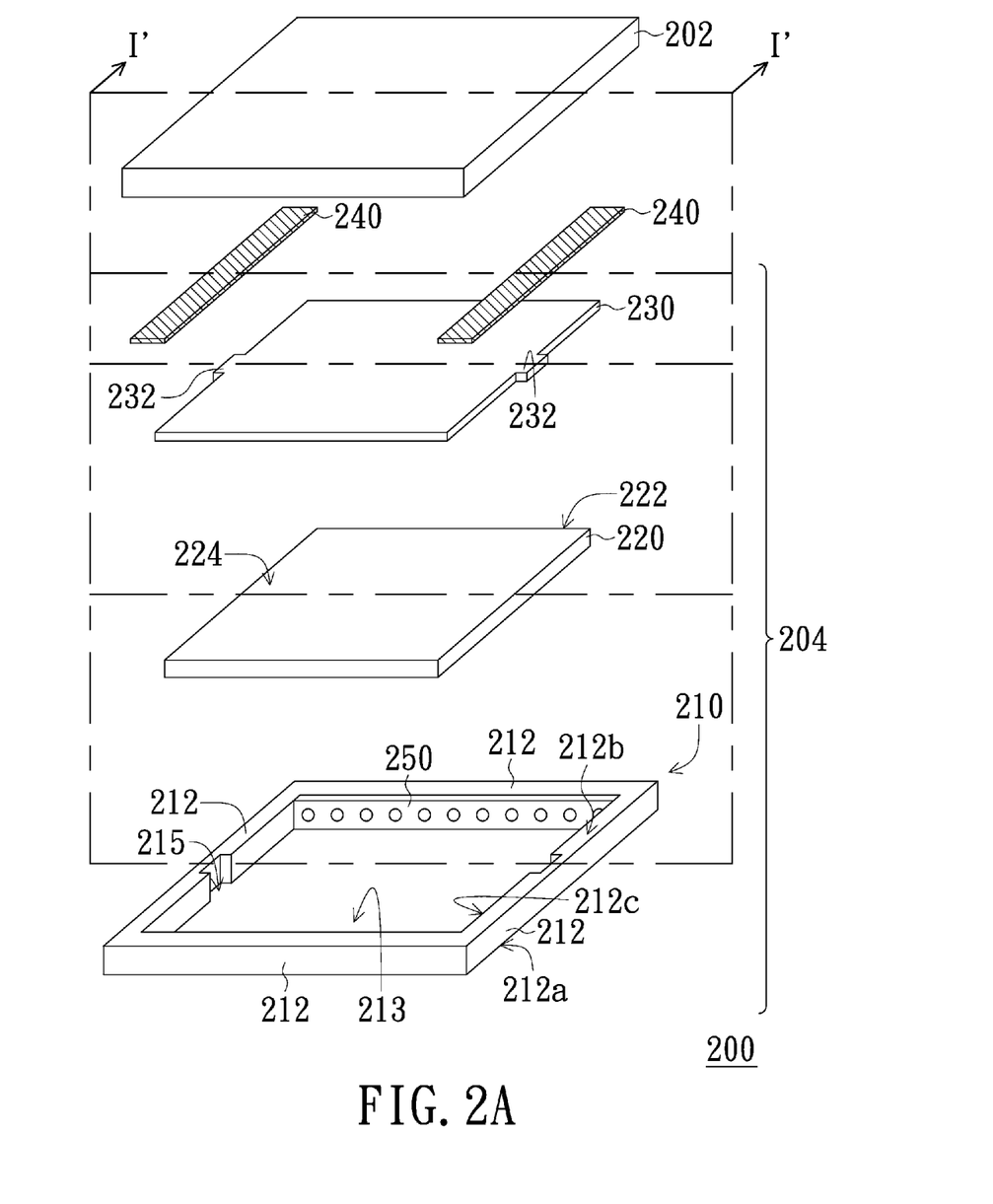
FIG. 2A is a schematic disassembling view of a display device according to an embodiment of the presented invention.
Figure 2B:
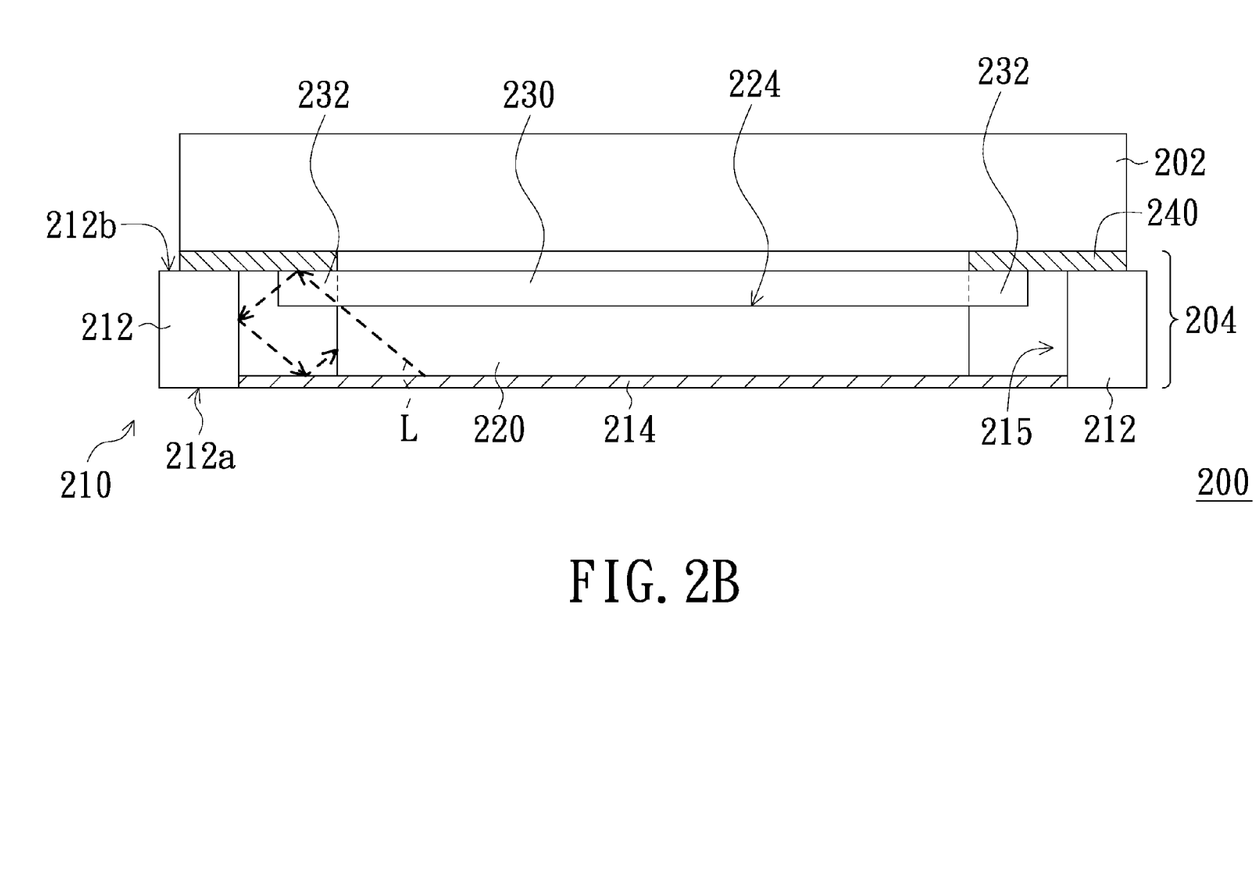
FIG. 2B is a cross-sectional, schematic view of the display device of FIG. 2A, taken along the line I-I'.

FIG. 2A is a schematic disassembling view of a display device according to an embodiment of the presented invention. FIG. 2B is a cross-sectional, schematic view of the display device of FIG. 2A, taken along the line I-I'. Referring to FIGS. 2A and 2B, the display device 200 includes a display panel 202 and a back light module 204. The display panel 202 is, for example, a liquid crystal display panel. The back light module 204 includes a bezel 210, a light-guide plate 220, at least one optical film 230 and a fixing element 240. The bezel 210 includes a plurality of frame strips 212, and the frame strips 212 surround an accommodating space 213. Each frame strip 212 has a bottom surface 212a, a carrier surface 212b and a lateral surface 212c. The display panel 202 is configured on the bezel 210 so as to be located on the carrier surfaces 212b of the frame strips 212. The bottom surface 212a is opposite to the carrier surface 212b, and the lateral surface 212c is connected between the bottom surface 212a and the carrier surface 212b and faces to the accommodating space 213. The lateral surface 212c of at least one of the frame strips 212 has a first cave 215 extended from the carrier surface 212b to the bottom surface 212a.

It should be noted that the bezel 210 may further includes a bottom plate 214. The bottom plate 214 can be a reflecting film or a metal plate adhered on the bottom surfaces 212a of the frame strips 212.

The light-guide plate 220 and the optical film 230 both are configured in the accommodating space 213 and the optical film 230 is located above the light-guide plate 220. Specifically, the light-guide plate 220 and the optical film 230 of this embodiment are sequentially configured on the bottom plate 214 of the bezel 210. The light-guide plate 220 has a light-incident surface 222 and a light-emitting surface 224. A side of the optical film 230 has at least one first protrusion 232 located within the first cave 215. That is, the optical film 230 and the bezel 210 can be positioned with each other by putting the first protrusion 232 within the first cave 215. Specially, as shown in FIG. 2B, the first protrusion 232 is suspended beside the light-guide plate 220 in this embodiment.

In general, the optical film 230 has two first protrusions 232 respectively formed at opposite side thereof, and the positions of the first protrusion 232 are symmetrical, but the invention is not limited hereto. The amount and the position of the first protrusion 232 of the optical film 230 can be determined by practical needs. Furthermore, the amount, profile and position of the first cave 215 all correspond to the amount, profile and position of the first protrusion 232.

As shown in FIG. 2A, the back light module 204 further includes a light source unit 250 configured beside the light-incident surface 222 of the light-guide plate 220. The light source unit 250 is used for providing the light to display image by the display panel 202. The fixing element 240 is configured on the carrier surface 212b and a portion of the optical film 230 and corresponds to the boundary between the first protrusion 232 and the first cave 215. In detail, the fixing element 240 is, for example, a black adhesive tape, white adhesive tape or a double-layer structure stacked by the white adhesive tape and the black adhesive tape sequentially. Accordingly, the fixing element 240 can be used for limiting the position of the protrusion 232 of the optical film 23 within the first cave 215 and preventing the light emitted from the light source unit 250 from leaking out through the boundary between the first protrusion 232 and the first cave 215. Specially, the fixing element 240 further can be a twin adhesive type so as to simultaneously fix the optical film 230 and the display panel 202 configured on the carrier surface 212b.

Referring to FIG. 2B, since the first cave 215 extends from the carrier surface 212b to the bottom surface 212a, the light L emitted from the light source unit 250 can be reflected back into the light-guide plate 220 by the inner wall of the first cave 215. Accordingly, the light L can emit out of the accommodating space 213 from a place where the fixing element 240 is not disposed. That is, the light L can emit out of the accommodating space 213 without passing through the fixing element 240. Therefore, it can prevent the light L from being repeatedly reflected in where corresponding to the first cave 215, so that the bright lines and the dark lines resulted from the light leaked out through the fixing element 240 can be eliminated.

Figure 3:
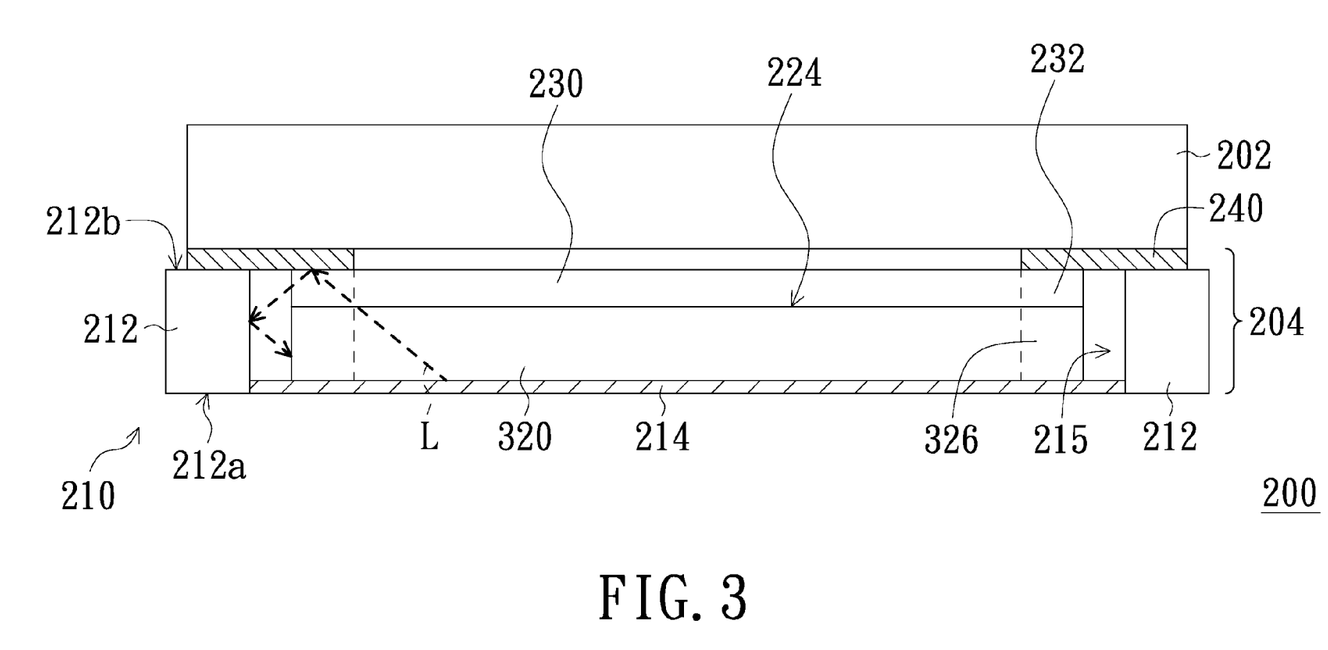
FIG. 3 is a cross-sectional, schematic view of the display device according to another embodiment of the presented invention.

FIG. 3 is a cross-sectional, schematic view of the display device according to another embodiment of the presented invention. Referring to FIG. 3, the display device of this embodiment is similar to the above-mentioned, however, light-guide plate 320 of this embodiment has a second protrusion 326 corresponding to the first protrusion 232 of the optical film 230 and located within the first cave 215. That is, the first protrusion 232 is located above the second protrusion 326. Accordingly, the light-guide plate 320 can be positioned related to the bezel 210 by the second protrusion 326 and the first cave 215 in this embodiment.

Figure 4:
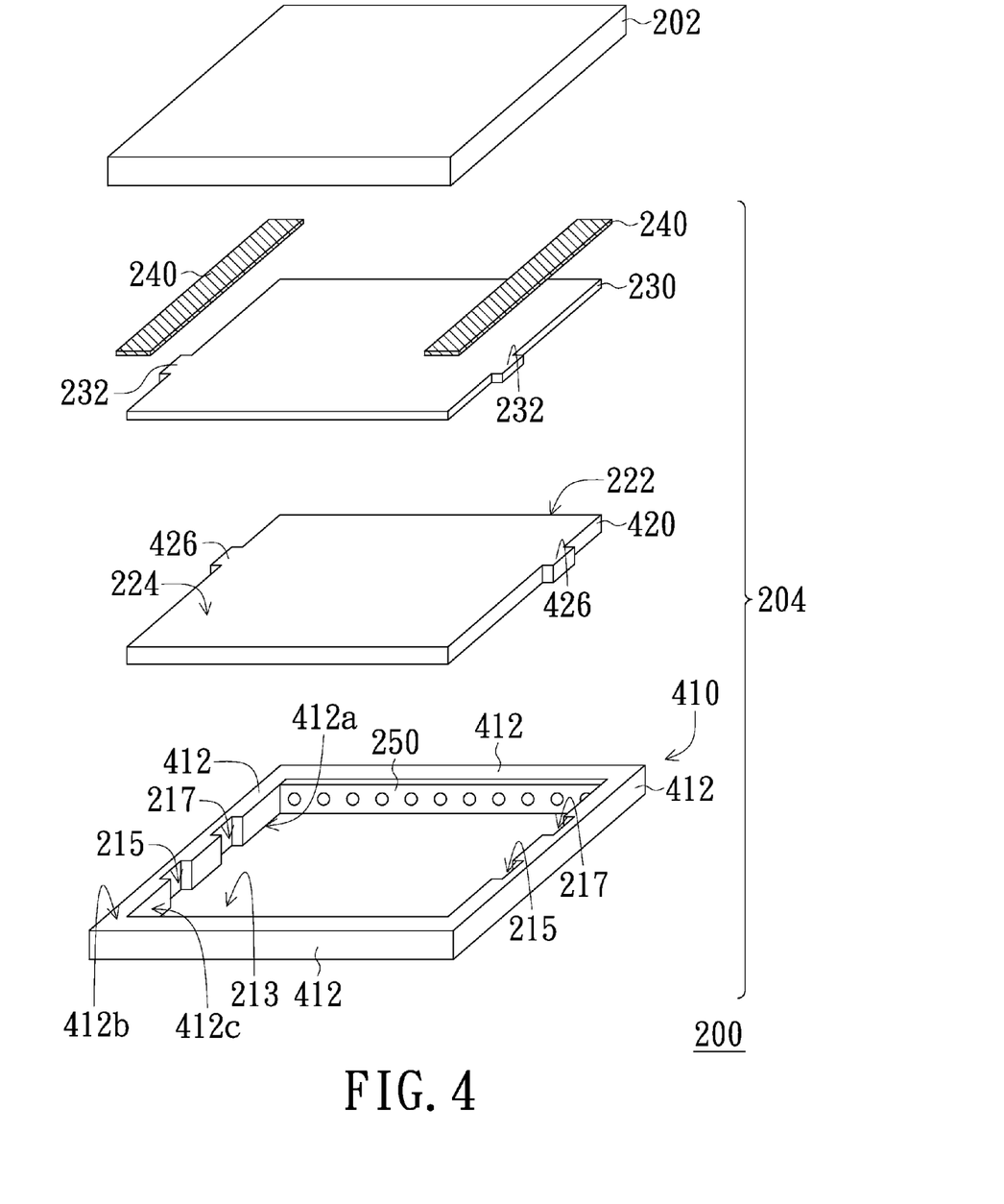
FIG. 4 is a cross-sectional, schematic view of the display device according to another embodiment of the presented invention.

In other embodiments, as shown in FIG. 4, the frame strip 412 has a second cave 217 and the light-guide plate 420 has a second protrusion 426 corresponding to the second cave 217, so that the light-guide plate 420 and the bezel 410 can be positioned related to each other by putting the second protrusion 426 within the second cave 217. It should be noted that the positions of the first cave 215 and the second cave 217 are staggered to avoid the light-guide plate 420 being dropped out of the accommodating space 213 with the optical film 230 and broken when the back light module 204 is placed upside down, light-guide plate 420.

Moreover, the amounts and the profiles of the second cave 217 and the second protrusion 426 can be determined according practical needs, the presented invention is not limited hereto.

Figure 5:
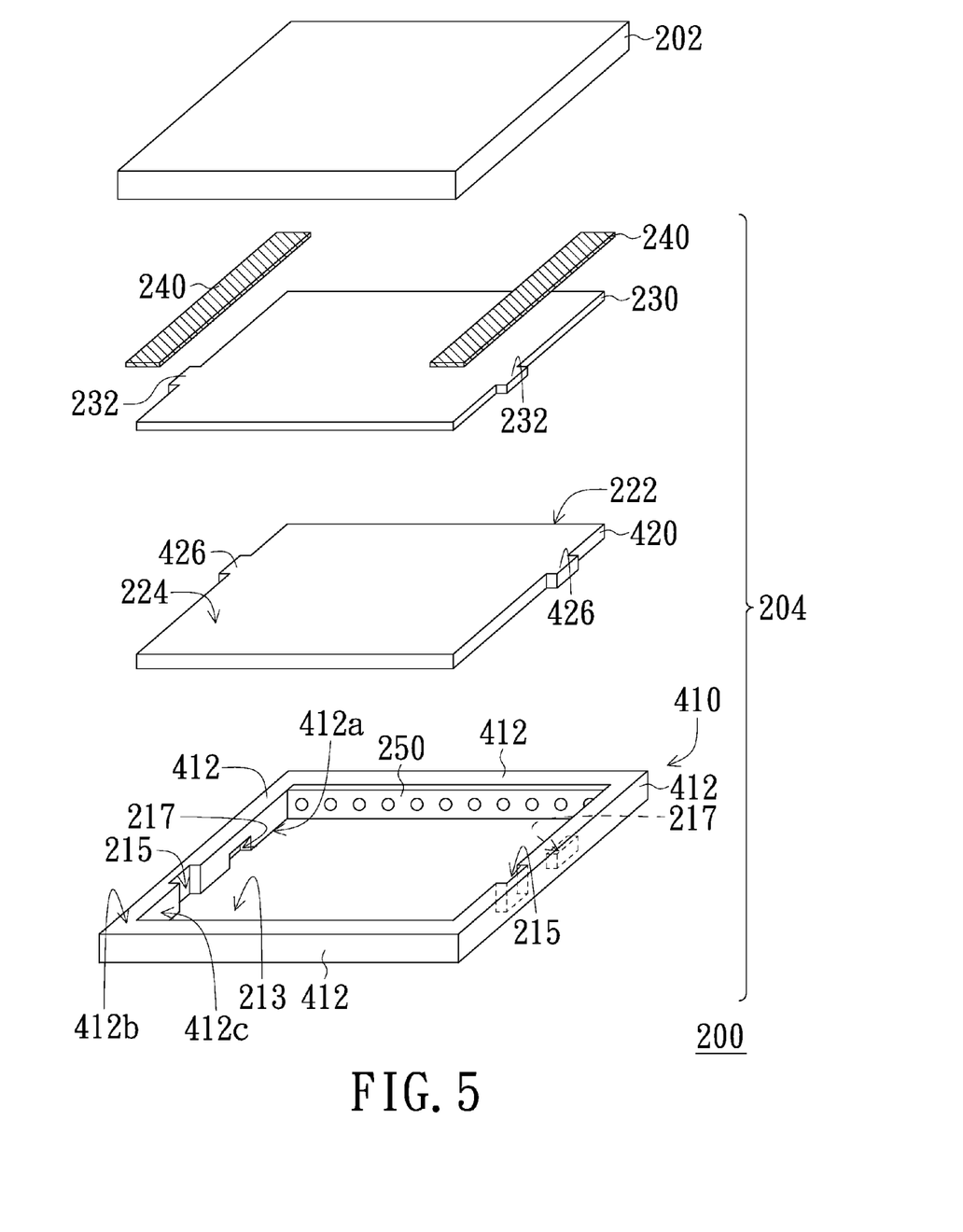
FIG. 5 is a cross-sectional, schematic view of the display device according to another embodiment of the presented invention.

Although the second cave 217 shown in FIG. 4 extends from the carrier surface 412b to the bottom surface 412a of the frame strip 412, but the presented invention is not limited hereto. In other embodiments, as shown in FIG. 5, the second cave 217 also can only extend to the bottom surface 412a but not to carrier surface 412b, and the light-guide plate 420 can be putted from the underside of the bezel 410 upwards into the accommodating space 213. Moreover, the protrusion 426 of the light-guide plate 420 is putted into the second cave 217.

In summary, the back light module of the embodiments of the presented invention includes a frame strip with the cave extending from the carrier surface to the bottom surface thereof for accommodating the protrusion of the optical film. Accordingly, the light emitted from the light source unit can avoid being reflected by the frame strip to form a dark band by emitting out through the fixing element. Also, the light can be reflected into the light-guide plate by the inner wall of the cave and then emitting out through the light-emitting surface of the light-guide plate. Therefore, both the light-emitting uniformity of the back light module and the display quality of the display device using the back light module can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A back light module, comprising:
a bezel comprising a plurality of frame strips surrounding an accommodating space, each frame strip has a bottom surface, a carrier surface and a lateral surface, the bottom surface being opposite to the carrier surface, the lateral surface connecting between the bottom surface and the carrier surface and facing to the accommodating space, the lateral surface of at least one of the frame strips has at least one first cave, the at least one first cave extended from the carrier surface to the bottom surface;
a light-guide plate configured in the accommodating space;
at least one optical film configured in the accommodating space and above the light-guide plate, a side of the optical film has at least one first protrusion located within the at least one first cave;
a fixing element configured on the carrier surfaces and a portion of the optical film and corresponding to a boundary between the at least one first protrusion and the at least one first cave; and
a light source unit configured in the accommodating space and located beside the light-guide plate to provide a light, wherein the light is reflected by an inner wall of the first cave after the light enters into the first cave, and then the light emits out of the accommodating space from a place where the fixing element is not disposed.

2. The back light module as recited in claim 1, wherein a side of the light-guide plate has at least one second protrusion corresponding to the first protrusion and located within the first cave.

3. The back light module as recited in claim 1, wherein the at least one first protrusion is suspended beside the light-guide plate within the at least one first cave.

4. The back light module as recited in claim 1, wherein the lateral surface of at least one of the frame strips further has at least one second cave and a side of the light-guide plate has at least one second protrusion correspondingly located within the at least one second cave.

5. The back light module as recited in claim 1, further comprising a bottom plate, wherein the frame strips and the light-guide plate are configured on the bottom plate.

6. The back light module as recited in claim 5, wherein the bottom plate comprises a reflecting film or a metal plate.

7. A display device, comprising:
a back light module, comprising:
a bezel comprising a plurality of frame strips surrounding an accommodating space, each frame strip has a bottom surface, a carrier surface and a lateral surface, the bottom surface being opposite to the carrier surface, the lateral surface connecting between the bottom surface and the carrier surface and facing to the accommodating space, the lateral surface of at least one of the frame strips has at least one first cave, the at least one first cave extended from the carrier surface to the bottom surface;
a light-guide plate configured in the accommodating space;
at least one optical film configured in the accommodating space and above the light-guide plate, a side of the optical film has at least one first protrusion located within the at least one first cave;
a fixing element configured on the carrier surfaces and a portion of the optical film and corresponding to a boundary between the at least one first protrusion and the at least one first cave; and
a light source unit configured in the accommodating space and located beside the light-guide plate to provide a light, the light is reflected by an inner wall of the first cave after the light enters into the first cave, and then the light emits out of the accommodating space from a place where the fixing element is not disposed; and
a display panel configured above the back light module.

8. The display device as recited in claim 7, wherein a side of the light-guide plate has at least one second protrusion corresponding to the first protrusion and located within the first cave.

9. The display device as recited in claim 7, wherein the at least one first protrusion is suspended beside the light-guide plate within the at least one first cave.

10. The display device as recited in claim 7, wherein the lateral surface of at least one of the frame strips further has at least one second cave and a side of the light-guide plate has at least one second protrusion correspondingly located within the at least one second cave.

11. The display device as recited in claim 7, wherein the back light module further comprises a bottom plate, wherein the frame strips and the light-guide plate are configured on the bottom plate.

12. The display device as recited in claim 11, wherein the bottom plate comprises a reflecting film or a metal plate.

* * * * *